Aug. 6, 1968  M. JOHNS  3,395,692
PORTABLE GRILL
Filed May 12, 1967  2 Sheets-Sheet 1
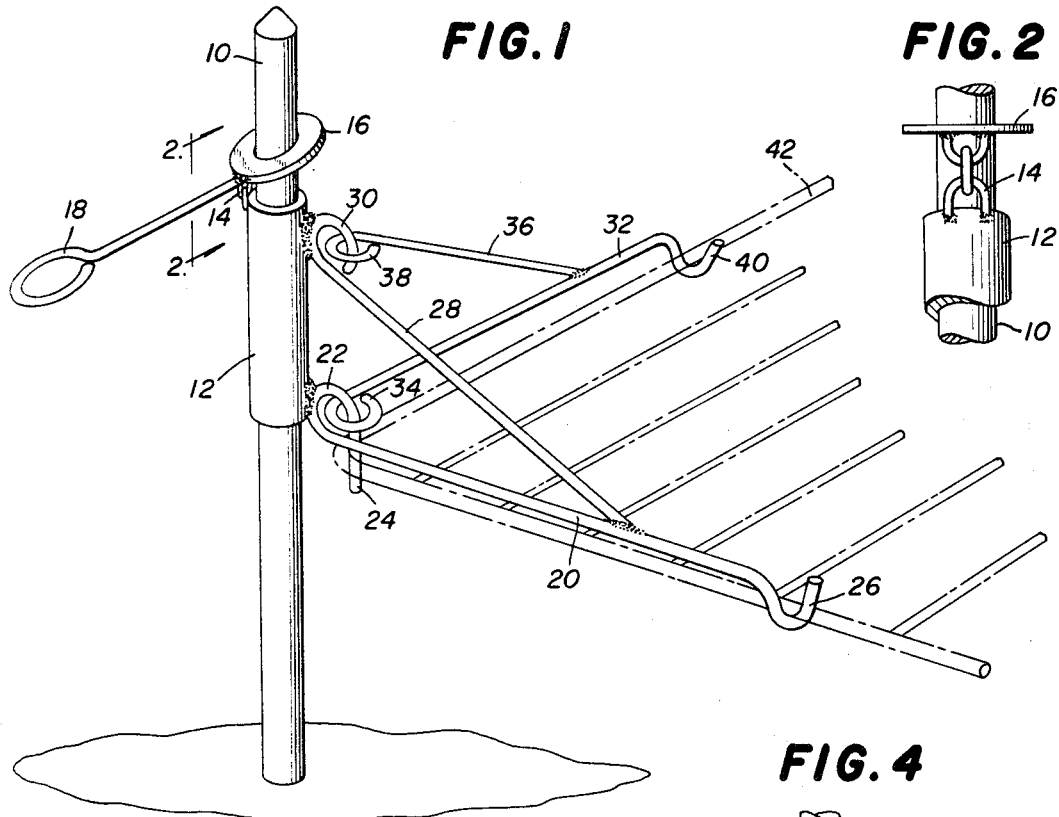
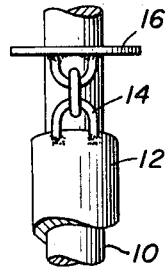
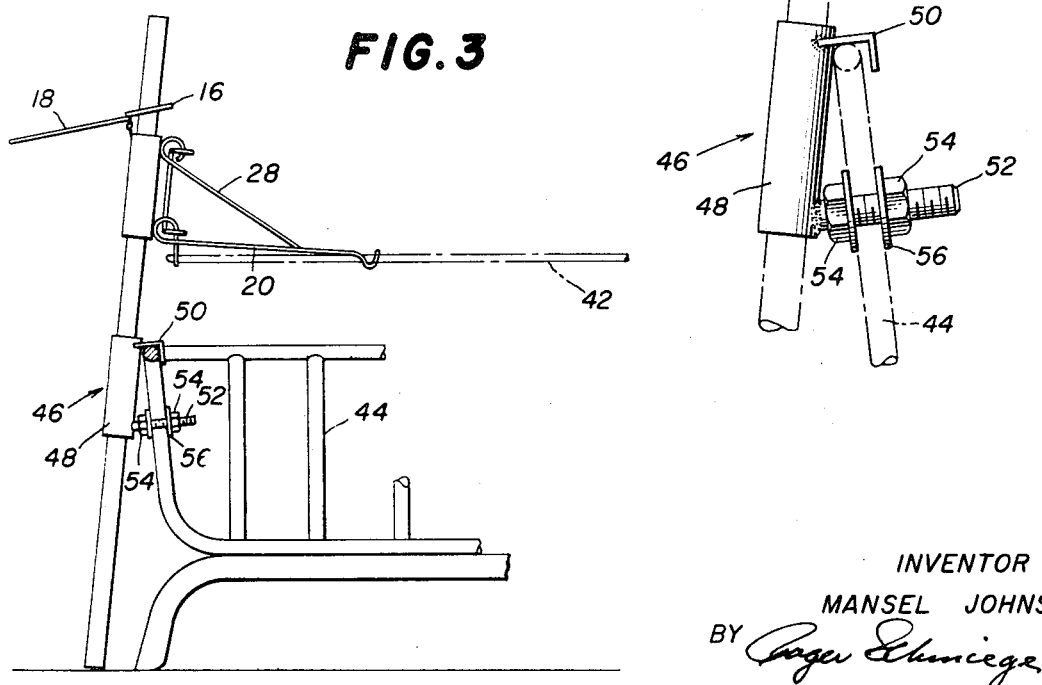
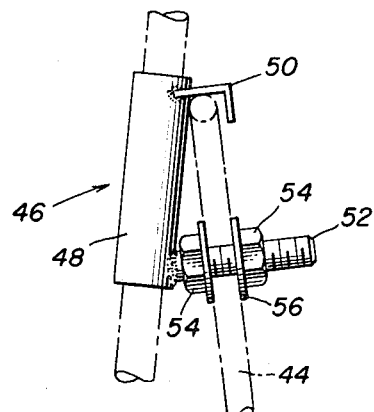
INVENTOR
MANSEL JOHNS
BY
ATTY.

Aug. 6, 1968  M. JOHNS  3,395,692
PORTABLE GRILL
Filed May 12, 1967  2 Sheets-Sheet 2
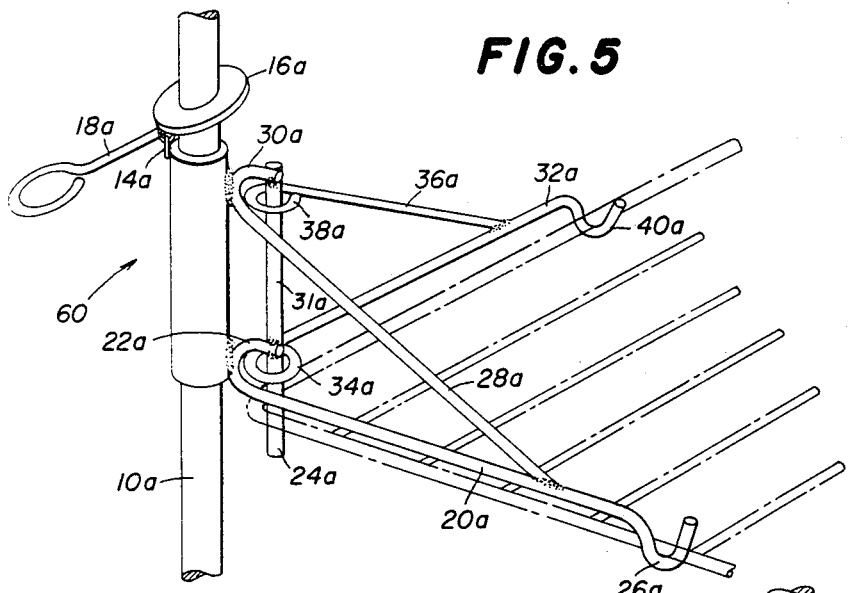
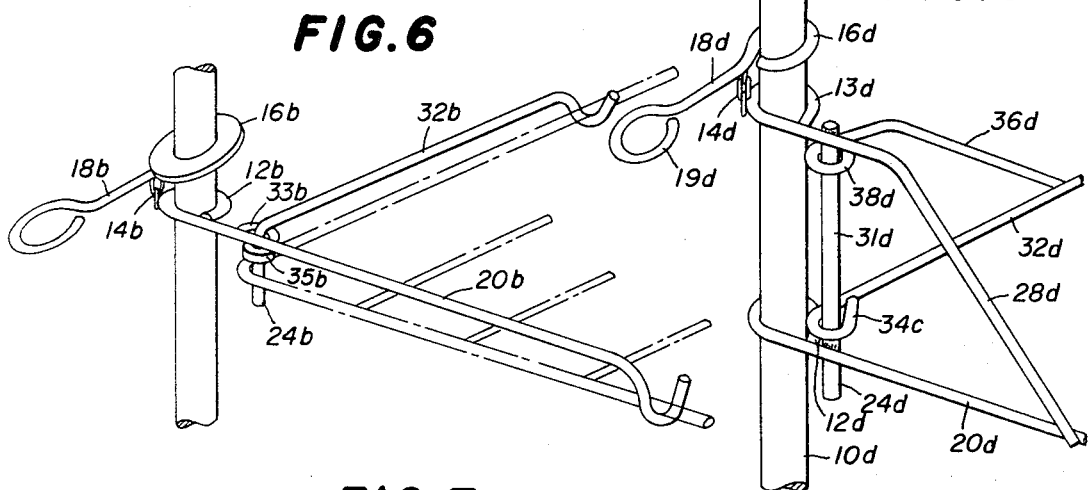
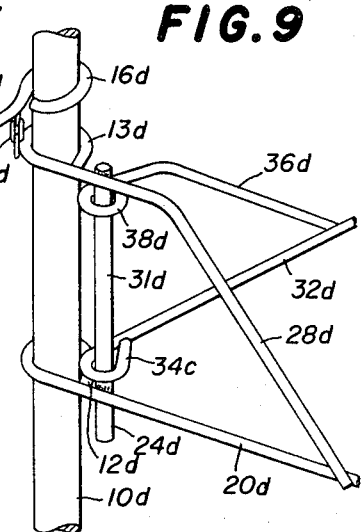
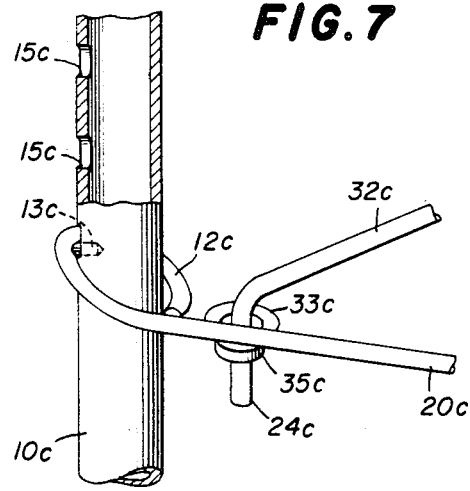
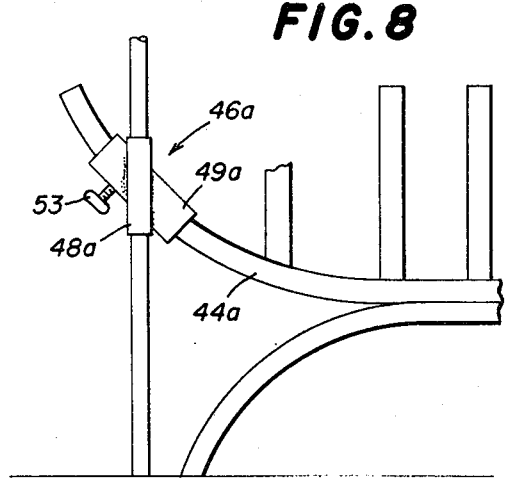

United States Patent Office 3,395,692
Patented Aug. 6, 1968

3,395,692
PORTABLE GRILL
Mansel Johns, 5305 Barton Road,
Madison, Wis. 53711
Filed May 12, 1967, Ser. No. 638,029
11 Claims. (Cl. 126—30)

ABSTRACT OF THE DISCLOSURE

A portable grill that may be used interchangeably as a grill over an open fire such as at a campsite or indoors within a fireplace for indoor cooking. The apparatus is portable, collapsible and adjustable.

Background

Prior to this invention, a great many outdoor cooking grills were manufactured to fill the large and ever growing charcoal cooking demands. The majority of these cooking apparatus were, however, used either as outdoor open fire cooking apparatus or as indoor fireplace cooking apparatus due to the difficulties of converting a given grill from an outdoor to an indoor function or vice versa. Relatively few of the grills, as mentioned, were adapted to be converted for use in both outdoor and indoor functions, primarily because of the complexity of the working parts and the inability to convert them in a minimum of time. Also, it should be noted that the apparatus that were used as outdoor and indoor grills prior to this invention were normally bulky, heavy, and relatively cumbersome to set up and adjust either outdoors or indoors.

For many years, those engaged in recreation such as campers and charcoal fire enthusiasts have sought a portable grill that could be easily assembled either outdoors at a campsite or indoors at a fireplace, which was light in weight, collapsible, easily adjustable, containing a minimum of working parts, and also economical. Though, as mentioned, there were grill apparatus available to fulfill some of these needs, there were no portable grills that combined all of the highly desirable traits in one single apparatus.

Summary of the invention

Briefly described, this invention is directed to a portable grill that is collapsible and may be adjusted for height without using set screws or the like. The portable grill is interchangeably used outside or inside.

The portable grill is comprised of three main parts, an upright member, a sliding tubular member and a grill member. The upright member has a tapered portion adapted to allow the member to be driven into the ground in an upright position or, if used in a fireplace, combined with an adaptor to place it in an upright position. The sliding tubular member may be formed as a loop or a sleeve and has vertical adjusting means associated therewith. The tubular member is adapted to cooperate with the upright member in holding a grill for cooking over an open fire. To enable the tubular member to hold the grill member, it is provided with a first stationary rod member that is an integral part thereof and perpendicularly and fixedly attached thereto. There is a second rod member pivotally attached to the first rod adjacent the point of attachment of the first rod to a tubular member. The second rod is adapted to swing outwardly to join the first rod at a maximum angle of 90° to the first rod. Each of the two rod members are provided with a hook at their respective outer ends to enable them to cooperate to cradle and hold the grill member.

The invention will be more clearly understood in view of the description and drawings in which:

FIGURE 1 is a broken away perspective view of a first embodiment of the invention;
FIGURE 2 is a view taken on lines 2—2 of FIGURE 1;
FIGURE 3 is an elevational view of the invention used in conjunction with an adaptor on a fireplace grate;
FIGURE 4 is a side elevational view of the adaptor shown on the fire place grate of FIGURE 3;
FIGURE 5 is a broken away perspective view of a second embodiment of this invention;
FIGURE 6 is a broken away perspective view of a third embodiment of this invention;
FIGURE 7 is a broken away perspective view of a fourth embodiment of this invention;
FIGURE 8 is an elevational view of a second embodiment of a fireplace adaptor that may be used in conjunction with the upright member to hold said member in a vertical position; and
FIGURE 9 is a broken away perspective view of a fifth embodiment of this invention.

Referring more particularly to the drawings, FIGURE 1 shows an upright member 10 which has a tapered and pointed lower portion (not shown). The upright member 10 is provided with a tubular member 12 that fits circumferentially around the upright member 10. Tubular member 12 is provided with a chain connector 14 at the top thereof which connects a disc-shaped adjusting member 16 of the same inner diameter as the outer diameter of upright member 10. The adjusting disc member 16 is adapted to slide vertically up and down on upright member 10 when disc 16 is perpendicular to the axis of upright member 10 and become wedged against member 10 when a handle member 18 fixedly attached thereto is lowered to place disc 16 at an angle to the axis of members 10 and 12 as shown in FIGURE 1. In this manner, disc 16 will hold tubular member 12 at a given vertical point on member 10. Tubular member 12 is provided with a first rod 20 which is fixedly attached to tubular member 12 at the outer surface of a loop 22 formed on the inner end thereof, i.e., that end adjacent member 12. Loop 22 terminates in an end portion 24 which extends below loop 22 and parallel with upright member 10 as shown in FIGURE 1. First rod 20 extends perpendicularly to and outwardly from tubular member 12 and terminates at its outer end in a hook member 26. First rod member 20 is braced with a first bracing rod 28, which rod 28 is fixedly attached to rod 20 and extends to form a loop 30 adjacent tubular member 12. Bracing rod 28 is fixedly attached on the surface of loop 30 to the upper portion of tubular member 12. A second rod member 32 is pivotally attached to loop member 22 of first rod 20 by means of a loop 34. Second rod member 32 is provided with a second bracing member 36 which is fixedly attached to second rod 32 and pivotally attached to loop 30 of bracing member 28 by means of a loop 38. Second rod member 32 also terminates at its outer extremity in a hook member 40 which is similar to hook member 26 of first rod 20. The hook members 26 and 40 are formed so as to face each other and lie in a plane parallel to that of the axis of upright member 10, as shown in FIGURE 1. Hook members 26 and 40, as well as end portion 24, serve to cradle and hold a grill 42 shown in broken outline in FIGURE 1. The weight of grill 42 serves to tip the grill downwardly at its outer extremity and upwardly over end portion 24 and secure and hold grill 42 within hooks 26 and 40 of rods 20 and 32. The hooks 26 and 40 may also be used to hang kettles, dutch ovens, pots and the like in which case they would serve independently of the grill 42.

FIGURE 2 shows a broken away portion of tubular member 12 and upright member 10 as shown by lines 2—2 of FIGURE 1. As shown, the chain connector 14 pivotally attaches disc member 16 with tubular member 12. As tubular member 12 is separated from disc member 16, the disc 16 becomes wedged on upright member 10 to adjust and hold the height of tubular member 12 on upright member 10.

FIGURE 3 shows a side elevational view of a fireplace grate 44 with an adaptor 46 attached thereto. Adaptor 46 is utilized primarily to hold member 10 in a vertically upright position. Adaptor 46 is comprised of a cylindrical member 48, an L-shaped hanger 50 which is fixedly attached to the upper portion of the cylindrical member 48 and an adjustable bolt 52 fixedly attached at the lower portion of cylindrical member 48 as shown in FIGURE 3. Adjusting nuts 54 and washers 56 on bolt 52 attach member 46 to grate 44. The details of adaptor 46 are more clearly shown in FIGURE 4.

As shown in FIGURE 3, the upright member 10 of the invention may be slightly tipped inwardly to allow any grease that may flow from meat on grill 42 to flow inwardly toward the fire rather than outwardly toward the outside portion of the fireplace.

FIGURE 5 is a second embodiment of the portable grill apparatus of this invention. As shown, FIGURE 5 is comprised of an upright member 10a similar to upright member 10 of FIGURE 1. Upright member 10 is provided with a tubular member 12a which fits over and slides on upright member 10a. There is a vertically adjusting member comprised of a disc 16a and a handle 18a similar to that shown in FIGURE 1 connected by chain connecting means 14a to a tubular member 12a. Tubular member 12a has a first rod 20a fixedly attached thereto at the outer surface of the end of rod 20a which forms a crescent loop 22a on that end attached to member 12a. First rod 20a, as in FIGURE 1, terminates at its outer end in a hook 26a. First rod member 20a is braced with a first bracing member 28a which is fixedly attached to rod 20a and forms a crescent loop 30a on that end fixedly attached to tubular member 12a.

There is a vertically extending rod 31a which is fixedly attached on the side of loop 30a of bracing member 28a and on the side of loop 22a of rod 20a. Vertically extending rod 31a is spaced from and parallel to tubular member 12a. As shown in FIGURE 5, a second rod member 32a is pivotally attached to rod 31a on that end adjacent upright member 10a as shown in FIGURE 5 by means of a loop 34a. Second rod member 32a is provided with a second bracing member 36a which is fixedly attached to second rod 32a and is pivotally attached to vertically extending rod 31a by means of a loop 38a. Second rod member 32a also terminates in its outer extremity in a hook member 40a which is similar to hook 26a of first rod member 20a. The hook members 26a and 40a are adapted to cradle and hold the grill such as shown and described in FIGURE 1.

FIGURE 6 shows a third embodiment of this invention with the elimination of tubular member 12 and 12a such as shown in FIGURES 1 and 5 with a loop 12b serving the same function as tubular members 12 and 12a of FIGURES 1 and 5. Loop 12b is shown as an extension of rod 20 which is shown as rod 20b in FIGURE 6. In place of the loops 34 and 34a on rod 32 shown in FIGURES 1 and 5, which serve as pivotal attachment for rods 32 and 32a, there is a loop 33b that is fixedly attached to rod 20b which allows rod 32b to extend therethrough and pivot thereon. Rod member 32b extends through loop 33b and is retained within loop 33b by means of a retainer 35b. Rod 32b has an end portion 24b which serves the same function as rods 24 and 24 of FIGURES 1 and 5. It will be noted that loop 12b may be adapted to meet upright member 10b at a slight angle to the extension of rod 20b to allow for perpendicular attachment of the rods 20b and 32b to upright member 10b.

FIGURE 7 shows an upright member 10c having holes 15c therein. A loop 12c similar to that of 12b shown in FIGURE 6, however, with a bend therein as shown, is fitted over upright member 10c and adapted to be held in place along upright member 12c by means of a pin 13c fixedly attached to loop 12c. It will be noted that rods 20c and 32c are similar to those shown in FIGURE 6 and rod 32c is pivotally attached to loop 33c and retained therein by retaining member 35c such as shown in FIGURE 6.

FIGURE 8 shows an adaptor generally shown as 46a that is comprised of a cylindrical member 48a similar to that shown in FIGURE 4. Cylindrical member 48a is fixedly attached to an adaptor member 49a, which member 49a is retained over a grill member 44a by means of a thumb screw 53. The adaptor generally shown as 46a is a second embodiment of a fireplace grill adaptor that may be utilized in conjunction with any of the portable grills described in conjunction with FIGURES 1, 5, 6 and 7.

FIGURE 9 is a fifth embodiment of the portable grill apparatus of this invention. As shown, FIGURE 9 is comprised of an upright member 10d similar to that of the upright members 10 in the previously described figures. Upright member 10 is embraced by loops 12d and 13d that are extensions of rod 20d and bracing rod 28d. There is a vertically extending rod 31d which is fixedly attached to the sides of rods 20d and 28d and serves as an attaching means for loops 34d and 38d on rods 32d and 36d respectively. Thus, rods 32d and 36d are pivotally attached to vertically extending rod 31d.

The vertically adjusting member of FIGURE 9 is comprised of a loop 16d instead of a disc-shaped member 16 such as shown in the previous figures, which loop 16d is an integral part of the handle 18d. Handle 18d is provided with loop 16d on one end and a loop 19d on the opposing end. The vertically adjusting member is provided with a chain linkage 14d that attaches loop 16d to loop 13d of bracing member 28d that embraces upright member 10d. The rods 20d and 32d extend to cradle a grill member such as shown in the previous FIGURES 1, 5, and 6.

*Operation*

In setting up the grill apparatus of this invention for use at a campsite for cooking food, the upright member 10 may be driven into the ground next to an open fire. The tubular member 12 or loops 12d and 13d (shown in FIGURE 9) provided with rods 20 and 32 adjacent one another (collapsed) may be slipped over the upper end of upright member 10 and adjusted at the proper height above the fire. In FIGURES 1, 5, and 6, adjustment is accomplished by pressing down on handle member 18 to wedge disc member 16 on upright member 10, thus stopping the downward movement of tubular member 12 on upright member 10. In FIGURE 9, the loop 16d may be teardrop-shaped to wedge against upright member 10. Second rod member 32 is pivoted outwardly to join the first rod member 20 at an angle of approximately 90° and a grill member 42 is placed over end portion 24 (from below as shown in FIGURES 1, 5, 6, 7 and 9 of the drawings) and will tip downwardly at its outer extremity so as to be cradled in hooks 26 and 40 of rods 20 and 32 respectively. The grill is then prepared for placement of food or cooking utensils thereon for cooking. The grill can be swung over the fire and away from the fire by turning upright member 10 on its axis.

It will be understood that this invention has been described in connection with certain specific embodiments thereof, however, this is by way of illustration and not limitation. Other embodiments utilizing the same inventive concept as that set forth herein will be evident to those skilled in the art and the scope of the invention is defined solely by the appended claims which should be construed as broadly as is consistent wtih the prior art.

What is claimed is:

1. A portable collapsible grill apparatus comprised of an upright member, a tubular member having vertical adjusting means associated therewith and a grill member, said tubular member adapted to fit circumferentially around said upright member and vertically adjust on said upright member by means of said adjusting means, said tubular member having a first rod member fixedly attached thereto and extending perpendicularly outwardly from said tubular member to terminate in a hook member, said first rod member having a second rod means pivotally attached thereto at the point of joinder of said first rod member to said tubular member, said second rod member adapted to be swung outwardly from said first rod member to form an angle of 90° therewith, and said first and second rod members adapted to cradle and hold said grill member.

2. The portable collapsible grill apparatus of claim 1 wherein said first and second members have first and second bracing members associated therewith to attach said rod members to said tubular member.

3. The portable collapsible grill apparatus of claim 1 wherein said first and second rod members have first and second bracing members associated therewith and wherein said second rod member is pivotally attached to said first rod member and said second bracing member is pivotally attached to said first bracing member.

4. The portable collapsible grill apparatus of claim 1 wherein said first rod member and said first bracing member have a vertically extending pin associated therewith and fixedly attached thereto and said second rod member and said second bracing member are pivotally attached to said pin.

5. The portable collapsible grill apparatus of claim 1 wherein said first rod member terminates in a loop which serves as said tubular member on said upright member and also is provided with a second loop adjacent said upright member and wherein said second rod member extends through said second loop and is pivotally attached within said loop member by means of a retaining member.

6. The portable collapsible grill apparatus of claim 1 wherein said vertical adjusting means are comprised of a cylindrical disc-shaped member associated with said tubular member and adapted to slide on said upright member when said disc is perpendicular to the axis of said member and adapted to become wedged against said upright member when placed at an angle to said upright member to hold said tubular member at a given point on said upright member.

7. The portable collapsible grill member of claim 1 wherein said upright member has holes therein and said tubular member has means adapted to fit within said holes and hold said tubular member and rod members at given vertical adjustment on said upright member.

8. The portable collapsible grill apparatus of claim 1 wherein an adaptor is associated therewith for bracing said upright member in an upright position adjacent a fireplace grate.

9. The portable collapsible grill apparatus of claim 1 wherein said apparatus has an adaptor associated therewith, said adaptor comprised of a cylindrical member and clamping means associated with said cylindrical member for clamping said cylindrical member on a fireplace grate and wherein said cylindrical member is adapted to allow said upright member to fit therein and remain in a vertically upright position.

10. The portable collapsible grill member of claim 1 wherein said vertical adjusting means are comprised of a handle and loop member attached to said tubular member means and said loop adapted to slide on said upright member when said loop member is perpendicular to the axis of said upright member and adapted to become wedged against said upright member when placed at an angle thereto to hold said tubular member means at a given point on said upright member.

11. The portable collapsible grill apparatus of claim 1 wherein said first rod member is provided with a first bracing member and said first rod member and said bracing member terminate in loops, which loops serve as said tubular member on said upright member and wherein said first rod member and said first bracing member have a vertically extending rod associated therewith and perpendicularly and fixedly attached thereto, said vertically extending rod member having a second rod member and a second bracing member pivotally attached thereto and wherein said first rod member, said first bracing member, said second rod member and said second bracing member serve to cradle and hold said grill member.

References Cited
UNITED STATES PATENTS 2,998,001  8/1961  Lofgren et al. _____ 126—30 X FREDERICK KETTERER, *Primary Examiner.*